A. O. DUPUY.
BLADE FOR PUGGING MILLS.
APPLICATION FILED NOV. 23, 1917.

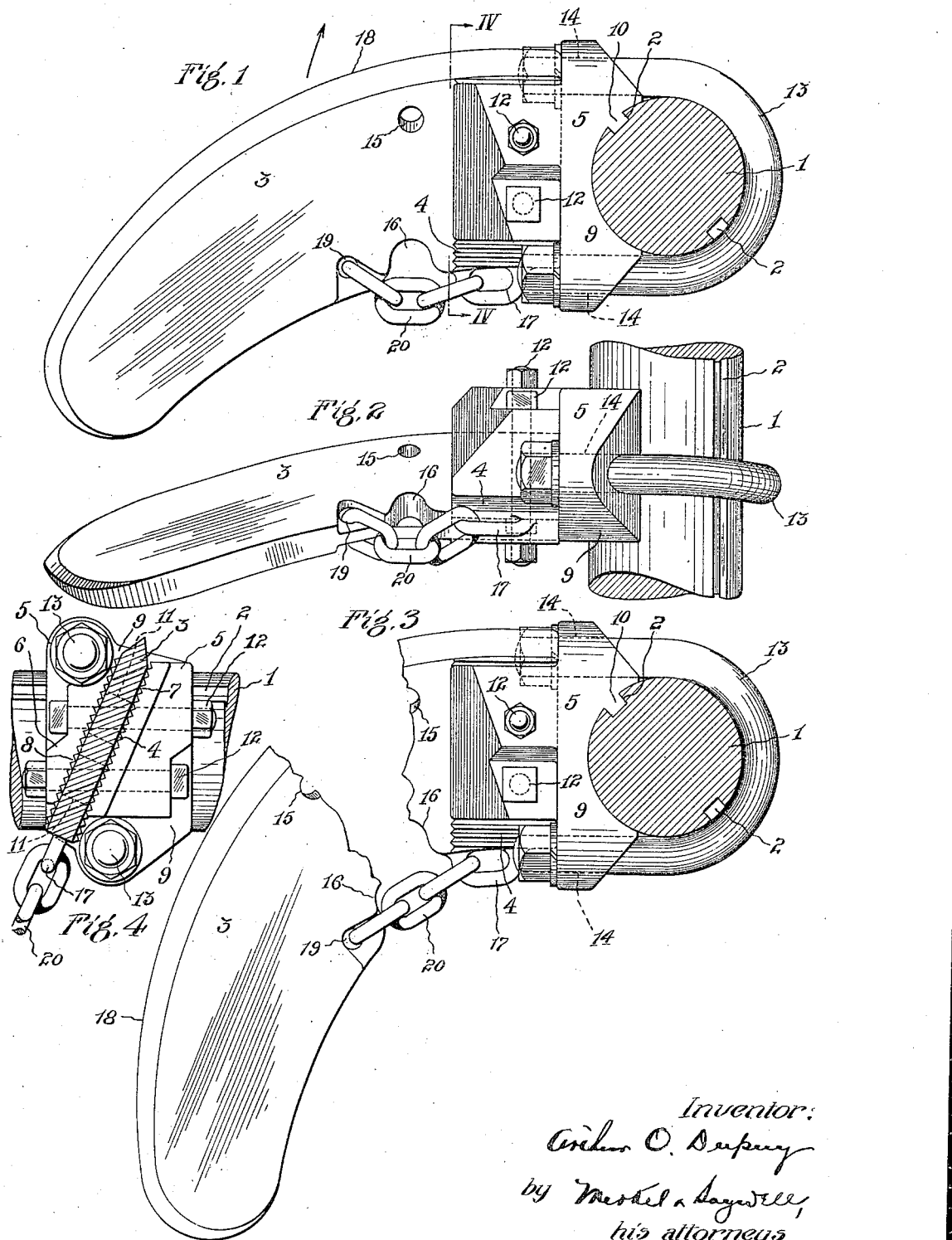

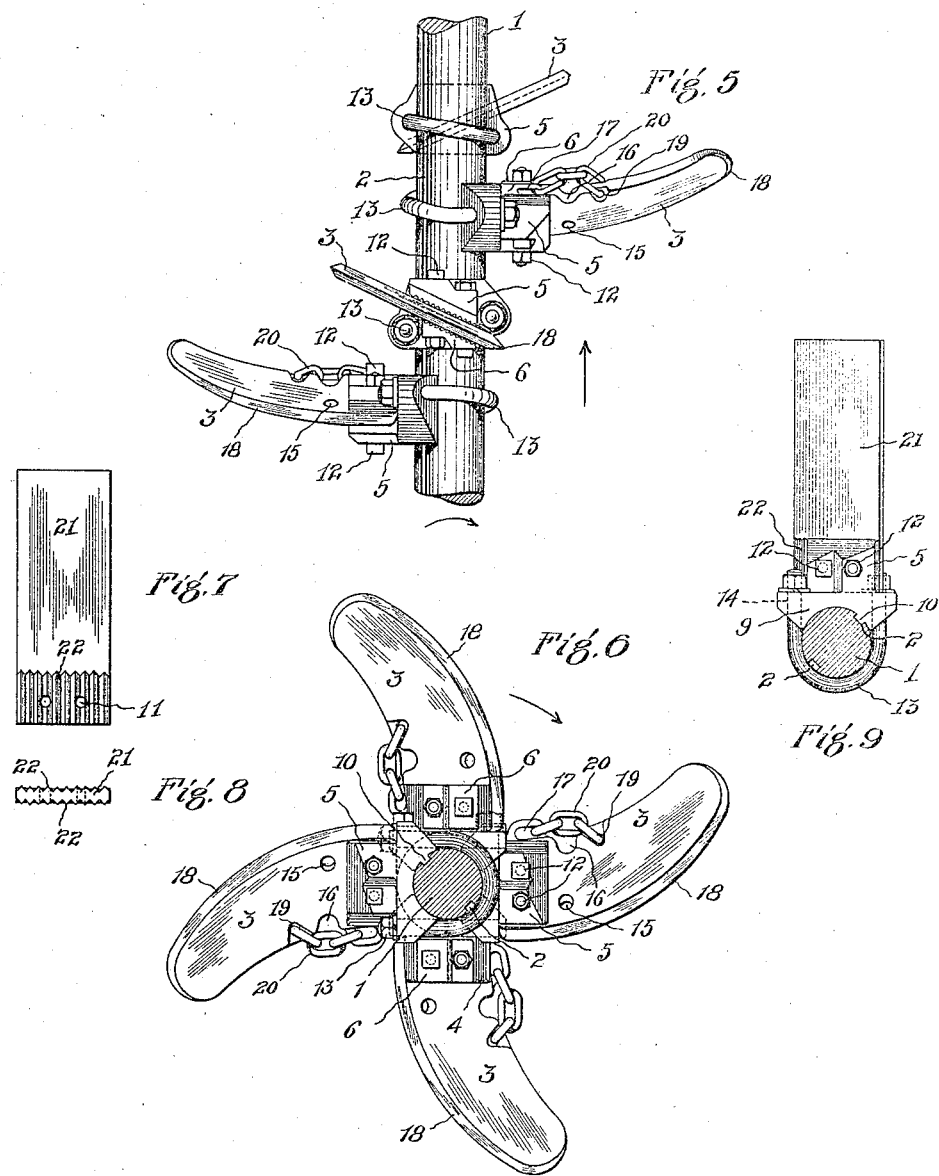

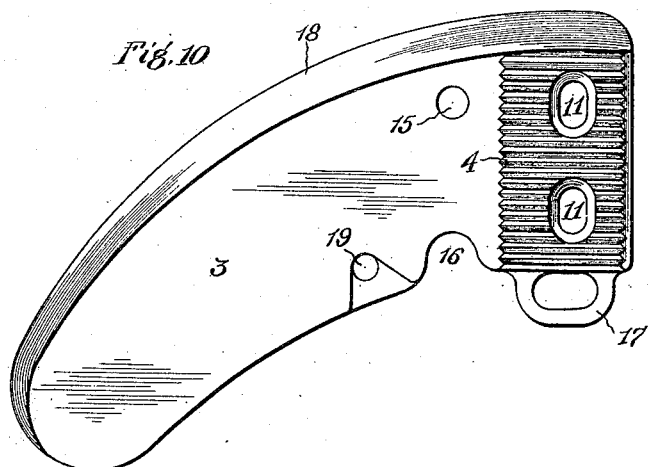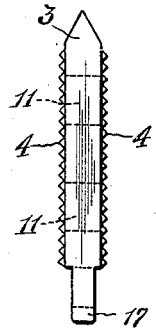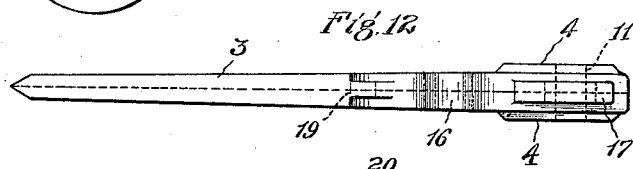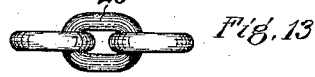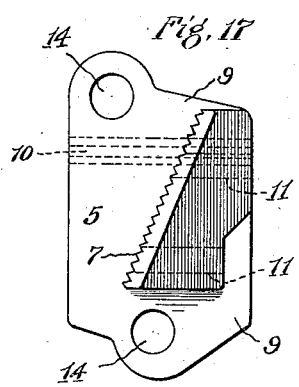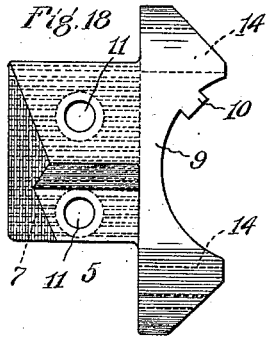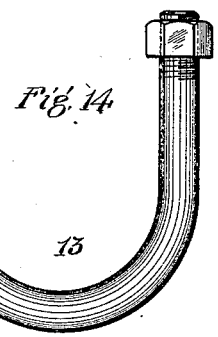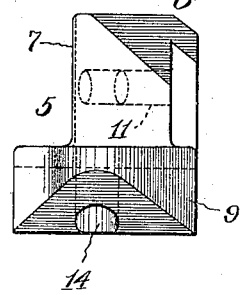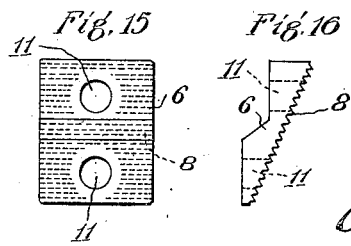

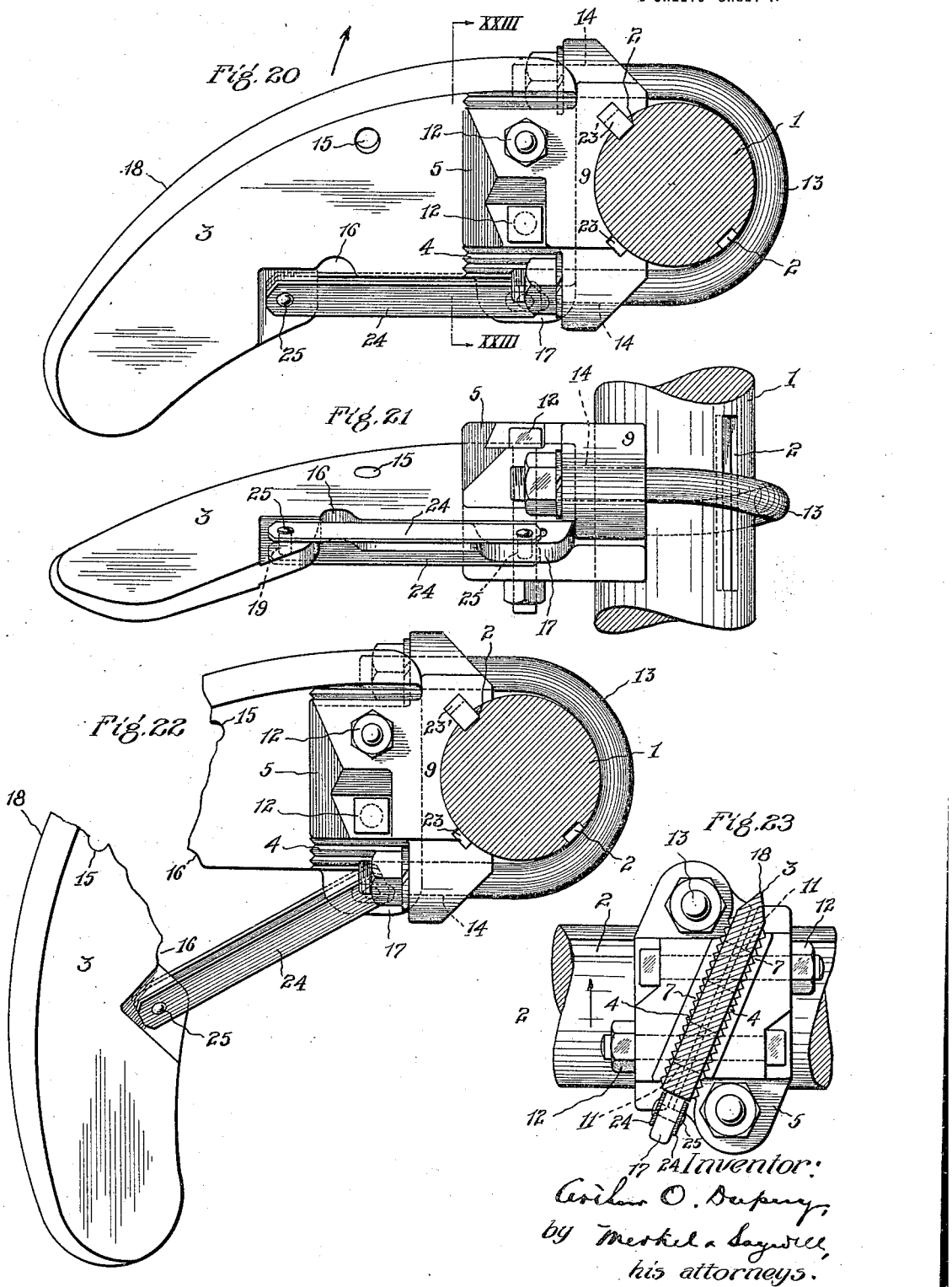

1,293,381.

Patented Feb. 4, 1919.
5 SHEETS—SHEET 5.

Inventor:
Archer O. Dupuy
by Merkel & Saywell,
his attorneys.

UNITED STATES PATENT OFFICE.

ARTHUR O. DUPUY, OF CLEVELAND, OHIO, ASSIGNOR OF ONE-HALF TO ERNEST W. FARR, OF CLEVELAND, OHIO.

BLADE FOR PUGGING-MILLS.

1,293,381. Specification of Letters Patent. Patented Feb. 4, 1919.

Application filed November 23, 1917. Serial No. 203,538.

*To all whom it may concern:*

Be it known that I, ARTHUR O. DUPUY, a citizen of the United States, resident of Cleveland, county of Cuyahoga, and State of Ohio, have invented new and useful Improvements in Blades for Pugging-Mills, of which the following is a specification, the principle of the invention being herein explained and the best mode in which I have contemplated applying that principle, so as to distinguish it from other inventions.

My invention relates to pugging mills and particularly to a new and improved blade for use in said mills and to certain improvements related to the connections of the blade with the pugging mill shaft.

Said invention is designed to provide a blade which shall be efficient in its operation; be economically provided and connected to the shaft; cause a minimum damage when broken; and be readily replaced.

The accompanying drawings and the following description set forth in detail certain means embodying my invention, the disclosed means, however, constituting but one of various mechanical forms in which the principle of the invention may be employed.

Figure 24:
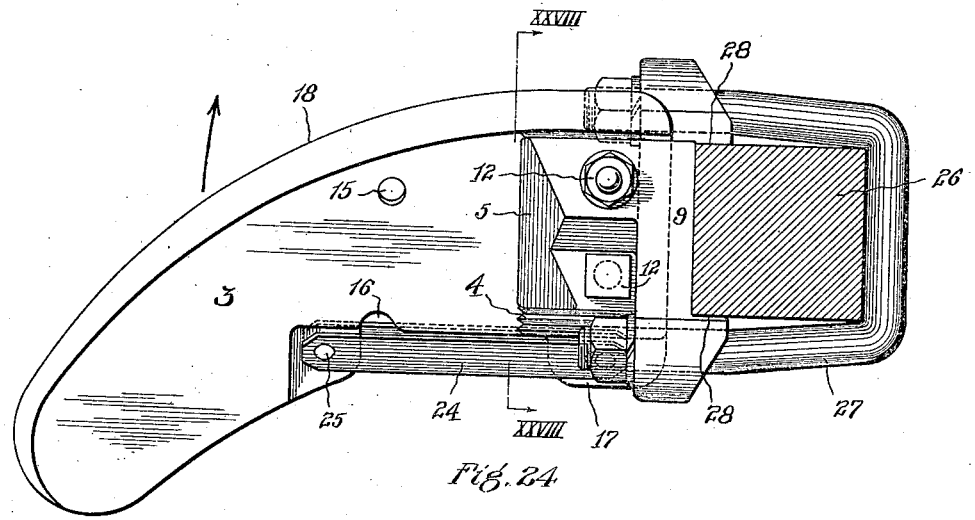
Figures 25, 26, 28:
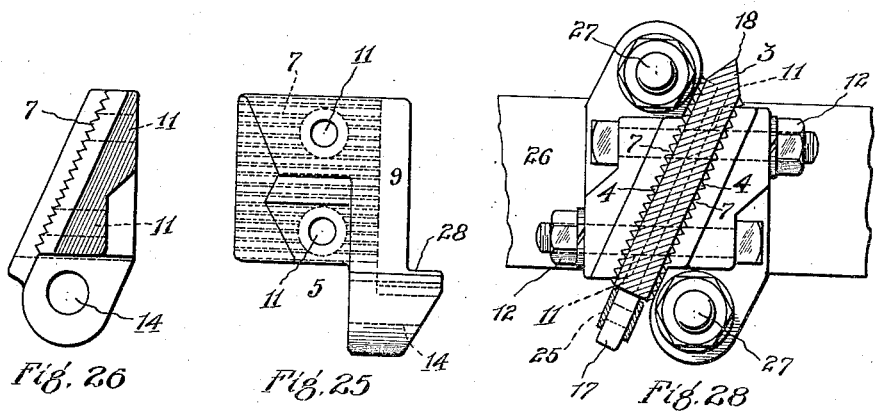
Figure 27:
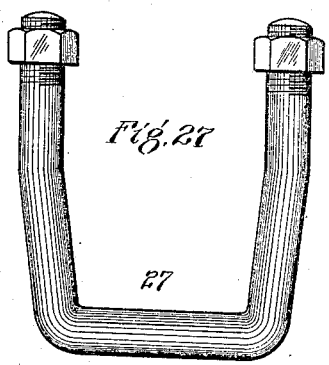

In said annexed drawings:

Figure 1 represents a side elevation of my improved blade showing the same assembled with my improved socket upon the pugging mill shaft, the view being taken in a plane perpendicular to the axis of the shaft; Fig. 2 represents a bottom plan view of the parts shown in Fig. 1; Fig. 3 is similar to Fig. 1, showing the blade after it has broken at a weakened section and the broken section entrained by means hereinafter fully described; Fig. 4 represents a view of the assembled blade and socket, taken in the plane indicated by line IV—IV in Fig. 1; Fig. 5 represents an assembly of four blades and their connected parts upon the shaft the same being shown in plan; Fig. 6 represents an end elevation of the parts shown in Fig. 5; Fig. 7 represents an elevation of a wrought iron straight blade; Fig. 8 represents an end view of the blade shown in Fig. 7; Fig. 9 represents an assembly of the wrought iron blade in its socket and mounted upon the shaft; Fig. 10 represents a side elevation of the improved blade shown in Fig. 1; Fig. 11 represents an end elevation thereof; Fig. 12 represents a bottom plan view of said blade; Fig. 13 represents an elevation of the flexible connection utilized for entraining a broken section of the blade; Fig. 14 represents an elevation of the U-bolt utilized to fixedly secure the socket to the shaft; Fig. 15 represents a side elevation of a washer forming part of a new and improved socket; Fig. 16 represents an end elevation thereof; Figs. 17, 18 and 19 represent, respectively, end and side elevations and a plan view of the major portion of my new and improved socket; Fig. 20 represents a side elevation of an assembled blade utilized in connection with a socket composed of two identical parts, showing the provision of an additional key recess in the two parts of the socket for reasons hereinafter fully explained, and also, showing a rigid connection between the base of the blade and that part of the blade which it is desired to entrain when the blade breaks, this view being taken in a plane perpendicular to the axis of the shaft; Fig. 21 represents a bottom plan view of the parts shown in Fig. 20; Fig. 22 is similar to Fig. 20 showing the positions assumed by the parts when a blade breaks; Fig. 23 represents an end elevation of an assembly of the blade and socket shown in Fig. 20, said view being taken in the plane indicated by the line XXIII—XXIII in Fig. 20; Fig. 24 represents an assembly of a modified form of blade and socket which is adapted to be used in connection with a square shaft, the two parts of the socket being identical; Fig. 25 represents one part of the two-part socket utilized in connection with the shaft shown in Fig. 24; Fig. 26 represents an end elevation of the socket part shown in Fig. 25; Fig. 27 represents an elevation of the U-bolt utilized in connection with the square socket; and Fig. 28 represents an end elevation of an assembly of the blade and socket shown in Fig. 24, said view being taken in the plane indicated by the line XXVIII—XXVIII in Fig. 24.

Referring to the accompanying drawings, a shaft of a pugging mill is represented at 1 capable of being rotated in any of the approved methods of this art, said shaft being provided with a pair of key-ways 2 spaced diametrically opposite. Upon said shaft are adapted to be secured, in four different positions, spaced a quadrant apart, blades 3, as is well known in this art. My improved blade is of the construction and shape plainly shown in Figs. 10, 11 and 12, having a considerable degree of longitudinal curvature from axis to tip, and is provided at the bottom end upon each side with longitudinally disposed teeth or ridges 4 and intermediate depressions forming the generally corrugated surface plainly shown in said Figs. 10, 11 and 12. I fixedly secure this blade to the shaft 1 by means of a socket comprising the member 5 and the washer 6, Figs. 15 to 19 inclusive. The member 5 comprises a shaft encircling end portion 9 provided with a tongue 10 adapted to be contained within a key-way 2 so as fixedly to secure the socket to the shaft. Said socket member 5 is provided upon one side with longitudinally disposed teeth 7 and the washer 6 with the longitudinally disposed teeth 8. Blade 3 is intended to be confined between the socket member 5 and the washer 6 in the general relation thereto plainly shown in Fig. 4, the teeth of the blade and those of the socket members being complementary so that they interlock, as plainly shown in said Fig. 4, the blade end and the socket members being provided with holes 11 through which bolts 12 may be passed so as rigidly to lock the blade and socket members together. It will be plainly seen in Figs. 1 and 10 that the number of teeth provided upon the blade is greater than the number provided upon the socket members and that the holes 11 of the blade are vertically elongated so that the blade may be disposed within the socket members in different vertical positions. When the blade and socket members are assembled they are fixedly secured to the shaft 1 by means of a U-bolt 13, as plainly shown in Figs. 1, 2 and 3, the portion 9 of the socket member 5 being provided with suitable holes 14 for the reception of said U-bolt 13. It will be noted from an inspection of Figs. 4, 16 and 17, that the socket members are so constructed that the blade is assembled therein in an inclined position. The forward and sharp edge of the blade is indicated by the ordinal 18.

In order that my improved blade may always break at a given section, I have formed the same with a weakened section which is designed to break under a minimum load relative to the loads under which it would break at any other section. I have provided this section in the plane of its greatest bending moment, viz., near its socket connection and the specific means which I have provided for giving it this weakened condition in this section are the provision of a hole 15, plainly shown in Fig. 1, and a recess 16 disposed in the same general vertical plane. The bottom of the end of the blade 3 which contains the corrugations 4 is formed with a ring 17 and the end of the blade 3 disposed beyond the line of the weakened section is formed with a hole 19 and in these holes are secured, respectively, the ends of a chain 20, so that when the blade 3 breaks, the broken end thereof will be entrained by said chain 20 and said broken section will not be fed through the mill or bend the shaft or break the socket or disturb the socket connection with the shaft, by reason of said section or stone wedging in the mill.

The assembled blade and socket can be secured in either key-way 2 in two positions spaced a quadrant apart by reversing the socket, so that the provision of only two key-ways is sufficient to enable the securing of four blades in the relative positions shown in Figs. 5 and 6.

Referring to Fig. 7, there is denoted therein by the numeral 21 a wrought iron blade provided with the longitudinally disposed teeth 22, an end elevation of said blade being shown in Fig. 8. Such a blade is used in a mill when the material contains a great many stones, because of the well-known property of said blade bending instead of breaking when an undue obstruction is encountered.

Referring to Figs. 20 to 23 inclusive, there is shown a socket comprising two identical parts, each part being provided with an additional recess 23, by means of which and the key 23' the socket part may be connected to the shaft 1 in two positions spaced a quadrant apart. This construction of socket cannot be reversed, as was true of the socket shown in Figs. 15 to 19 inclusive, so that in order to be enabled to secure the blade in four different positions upon shaft 1, it is necessary to make some other provisions. This is effected by shifting the socket parts of the construction shown in Fig. 20 a distance of a quadrant upon the shaft, said shaft being provided with two key-ways 2, as was also true in the construction shown in Fig. 1, each key 23' being capable of use in either recess 23. Also, there is shown in said Fig. 20 a rigid connection 24 between the socket and the end of part 3, which it is desired to entrain when the blade breaks at its weakened section, previously hereinbefore fully explained. Said rigid connection 24 is pivotally attached to the blade ends, respectively, by the pins 25.

Referring to Fig. 24, the application of my improvements to a square shaft 26 is shown, the special form of U-bolt for connecting the assembled socket and blade to such a square shaft being indicated by the ordinal 27. The formation of the two-part socket is plainly shown in Figs. 25 and 26, the projecting lip 28 of the socket parts adapted to be securely fastened to the square shaft being plainly shown in Figs. 24 and 25. In order to assemble this socket and blade in any one of the four positions around the square shaft, it is only necessary to move the socket to the desired position and fasten it by means of the U-bolt 27.

What I claim is:

1. In pugging mills, the combination of a rotatable shaft; a pugging blade formed upon each side with a plurality of corrugations; a socket fixedly secured to said shaft and formed with a surface provided with a plurality of corrugations; a washer also formed with a surface provided with a plurality of corrugations; and means for locking said blade intermediately said socket and washer, said blade corrugations and socket and washer corrugations interlocking.

2. In pugging mills, the combination of a rotatable shaft; a pugging blade formed upon each side at one end with a plurality of corrugations; a socket fixedly secured to said shaft and formed with a surface provided with a plurality of corrugations; a washer also formed with a surface provided with a plurality of corrugations, the number of said blade corrugations being greater than the number of said socket and washer corrugations; and means for locking said blade intermediately said socket and washer, said blade corrugations and socket and washer corrugations being interlocked in a selective position in a plane transverse and not right-angular to the shaft axis.

3. In pugging mills, the combination of a rotatable shaft; a pugging blade; means fixedly secured to said shaft, said blade and means being provided with a series of complementary raised areas and intermediate grooves; and means locking said areas and grooves together, said shaft, blade, and series of areas and grooves being relatively so disposed that said blade is secured to said shaft at an angle thereto other than a right angle.

4. A pugging mill blade formed with a positively weakened section.

5. A pugging mill blade formed with slots near its secured end to create a weakened section.

6. A pugging mill blade formed to break positively at a given section under a minimum load.

7. In pugging mills, the combination of a rotatable shaft; a plurality of pugging blades; and means for fixedly securing said blades spirally of said shaft, said blades being formed, respectively, with weakened sections adjacent their secured ends.

8. In pugging mills, the combination of a rotatable shaft; a pugging blade; a two-piece socket; means for fixedly securing said blade within the parts of said socket; and means fixedly securing said socket to said shaft, the arrangement being such that said blade is disposed upon the shaft so as to form an acute angle therewith.

9. In pugging mills, the combination of a rotatable shaft; a pugging blade having a considerable degree of longitudinal curvature from axis to tip; a two-piece socket; means for fixedly securing said blade within the parts of said socket; and means fixedly securing said socket to said shaft.

10. In pugging mills, the combination of a rotatable shaft; a pugging blade; means for fixedly securing said blade to said shaft, said blade being formed with a positively weakened section; and means for entraining the severed section of the blade when the latter breaks.

11. In pugging mills, the combination of a rotatable shaft; a pugging blade adapted to be connected thereto; means allowing the relative disposition of said shaft and blade to be selective in a plane transverse and not right angular to the axis of the shaft; and means for fixedly securing said blade to said shaft.

12. In pugging mills, the combination of a rotatable shaft; a pugging blade adapted to be connected thereto; and means for procuring said connection, including a socket provided with locking elements, said blade being provided with coöperating locking elements selectively engageable with the locking elements of said socket, and a bolt or similar rigid fastening means.

13. In pugging mills, the combination of a rotatable shaft; a pugging blade adapted to be connected thereto; and means for procuring said connection, including a socket formed with a plurality of corrugations, said blade being provided with corrugations adapted to interlock with, and greater in number than, said socket corrugations, whereby said corrugations may be interlocked in different vertical positions of the blade upon the shaft, and a bolt or similar rigid fastening means.

14. In pugging mills, the combination of a rotatable shaft; a pugging blade adapted to be connected thereto so as to form an acute angle therewith; means allowing the relative disposition of said shaft and blade to be selective in a plane transverse and not right angular to the axis of the shaft; and means for fixedly securing said blade to said shaft.

15. In pugging mills, the combination of a rotatable shaft formed with key-ways; a pugging blade; and means secured to said blade and secured in said key-ways for fixedly securing said blade to said shaft, said means being adapted to be secured in said key-ways in a plurality of different positions relatively thereto, whereby said blade can be secured to said shaft in a number of positions relatively thereto which will be a multiple of the number of said key-ways.

16. In pugging mills, the combination of a rotatable shaft formed with key-ways; a pugging blade; and means secured to said blade and secured in said key-ways for fixedly securing said blade to said shaft, said means being adapted to be secured in said key-ways in a plurality of different positions relatively thereto and at equal radial distances from the shaft axis, whereby said blade can be secured to said shaft in a number of positions relatively thereto which will be a multiple of the number of said key-ways.

17. In pugging mills, the combination of a rotatable shaft formed with key-ways; a pugging blade; and means secured to said blade and secured in said key-ways for fixedly securing said blade to said shaft, said means being reversible so as to be adapted to be secured in said key-ways in two different positions relatively thereto, whereby said blade can be secured to said shaft in twice the number of positions relatively thereto as the number of said key-ways.

18. In pugging mills, the combination of a rotatable shaft; a wrought iron pugging blade formed with a plurality of corrugations at one end; a socket fixedly secured to said shaft and formed with corrugations complementary to said blade corrugations; and means adapted to hold said complementary corrugations interlocked.

Signed by me, this 13th day of November, 1917.

ARTHUR O. DUPUY.

Copies of this patent may be obtained for five cents each, by addressing the "Commissioner of Patents, Washington, D. C."